US012528307B2

(12) United States Patent
Takemura et al.

(10) Patent No.: US 12,528,307 B2
(45) Date of Patent: Jan. 20, 2026

(54) HEAT-SENSITIVE RECORDING BODY

(71) Applicant: Oji Holdings Corporation, Tokyo (JP)

(72) Inventors: Takashi Takemura, Tokyo (JP); Naonobu Sugiyama, Tokyo (JP); Daiki Watanabe, Tokyo (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 129 days.

(21) Appl. No.: 18/032,509

(22) PCT Filed: Oct. 19, 2021

(86) PCT No.: PCT/JP2021/038517
§ 371 (c)(1),
(2) Date: Apr. 18, 2023

(87) PCT Pub. No.: WO2022/085657
PCT Pub. Date: Apr. 28, 2022

(65) Prior Publication Data

US 2023/0391126 A1 Dec. 7, 2023

(30) Foreign Application Priority Data

Oct. 20, 2020 (JP) ................................ 2020-176164

(51) Int. Cl.
*B41M 5/333* (2006.01)
*B41M 5/323* (2006.01)
*B41M 5/337* (2006.01)
*B41M 5/42* (2006.01)
*B41M 5/44* (2006.01)

(52) U.S. Cl.
CPC .......... *B41M 5/3333* (2013.01); *B41M 5/323* (2013.01); *B41M 5/3377* (2013.01); *B41M 5/42* (2013.01); *B41M 5/426* (2013.01); *B41M 5/44* (2013.01); *B41M 2205/04* (2013.01); *B41M 2205/38* (2013.01)

(58) Field of Classification Search
CPC .. B41M 5/323; B41M 5/3333; B41M 5/3377; B41M 5/42; B41M 5/426; B41M 5/44; B41M 2205/04; B41M 2205/38
See application file for complete search history.

(56) References Cited

U.S. PATENT DOCUMENTS 6,579,829 B2 6/2003 Nishimura
7,098,168 B2 8/2006 Iwasaki
9,073,376 B2 7/2015 Ogino
2001/0036903 A1 11/2001 Nishimura
2003/0125205 A1* 7/2003 Kaneko .................... B41M 5/44 503/226
2005/0088508 A1 4/2005 Iwasaki
2006/0046933 A1 3/2006 Iwasaki
2009/0130441 A1* 5/2009 Kuga ......................... C08J 9/32 428/349
2014/0315713 A1 10/2014 Ogino
2021/0268821 A1 9/2021 Sakamoto
2021/0340099 A1 11/2021 Kinishi

FOREIGN PATENT DOCUMENTS

CN 1318776 A 10/2001
CN 1606507 A 4/2005
CN 1606508 A 4/2005
CN 104024220 A 9/2014
JP H05-286248 A 11/1993

(Continued)

OTHER PUBLICATIONS

Aluminum Compounds; Jul. 21, 2023; https://www.toshin-kasei.co.jp/syohin/alumi.pdf (1 sheet, 1 sheet translation, 2 sheets total).
Fine-grained Haydylite; Showa Denko KK; Jul. 21, 2023; https://www.sdk.co.jp/assets/files/products/1203/1203_01.pdf (1 sheet, 1 sheet translation, 2 sheets total).
Imported kaolin BASF product (formerly ENGELHARD); Toshin Chemicals Co., Ltd.; Jul. 21, 2023; https://toshin-kasei.co.jp/importkaolin/ (5 sheets, 5 sheets translation, 10 sheets total).
International Search Report for International Application PCT/JP2021/038517 dated Jan. 11, 2022 (2 sheets, 2 sheets translation, 4 sheets total).

(Continued)

*Primary Examiner* — Gerard Higgins
(74) *Attorney, Agent, or Firm* — Kratz, Quintos & Hanson, LLP

(57) ABSTRACT

Disclosed is a heat-sensitive recording material comprising an undercoat layer and a heat-sensitive recording layer in this order on a support, the undercoat layer containing hollow particles, a binder, and an inorganic pigment I, the heat-sensitive recording layer containing a leuco dye, a developer, and an inorganic pigment II, and the heat-sensitive recording layer containing an N,N'-diarylurea-based compound represented by the following formula (1):

(1)

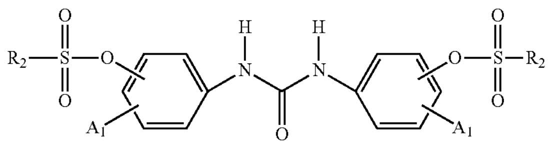

wherein $R_2$s may be the same or different, and each represents $C_{1-12}$ alkyl, $C_{7-12}$ aralkyl, or $C_{6-12}$ aryl, and the aralkyl and the aryl may be each substituted with $C_{1-12}$ alkyl, $C_{1-12}$ alkoxy, $C_{6-12}$ aryl, or halogen; $A_1$s may be the same or different, and each represents hydrogen or $C_{1-4}$ alkyl, as the developer, and a pigment with an oil absorption of 130 ml/100 g or less as the inorganic pigment II.

11 Claims, No Drawings

(56) References Cited

FOREIGN PATENT DOCUMENTS

| | | | |
|---|---|---|---|
| JP | 2011-105638 | A | 6/2011 |
| JP | 2012-214721 | A | 11/2012 |
| JP | 2012-218311 | A | 11/2012 |
| JP | 2013-220580 | A | 10/2013 |
| JP | 2017-209915 | A | 11/2017 |
| JP | 2019-043005 | A | 3/2019 |
| WO | 2019/044462 | A1 | 3/2019 |
| WO | 2020/004558 | A1 | 1/2020 |

OTHER PUBLICATIONS

Office Action of corresponding Chinese Patent Application No. 202180071705.0 dated Mar. 11, 2025 (11 sheets, 12 sheets translation, 23 sheets total).

Office Action for corresponding Korean Patent Application No. 10-2023-7012054 dated Nov. 11, 2025 (8 sheets, 9 sheets translation, 17 sheets total).

* cited by examiner

HEAT-SENSITIVE RECORDING BODY

TECHNICAL FIELD

The present invention relates to a heat-sensitive recording material.

BACKGROUND ART

Heat-sensitive recording materials, which are in wide practical use, record color images by taking advantage of a heat-induced color development reaction between a colorless or pale-colored leuco dye and a phenol or an organic acid. Such heat-sensitive recording materials have advantages in that, for example, color images can be formed simply by the application of heat, and further, recording devices for these can be compact, can be easily maintained and generate less noise. For this reason, heat-sensitive recording materials have been used in a broad range of technical fields as information-recording materials for printing devices such as label printers, automatic ticket vending machines, CD/ATMs, order form output devices for use in restaurants etc., data output devices in apparatuses for scientific research, etc.

Since such a color development reaction is a reversible reaction, color images are known to fade with time. This color-fading reaction is accelerated in a high-temperature, high-humidity environment, and further progresses rapidly by contact with oils, plasticizers, etc., and color may fade to such an extent that recorded images become illegible. In recent years, disinfection and sterilization with alcohol have become common practice in general life, especially for the prevention of infectious diseases. Thus, there is an increasing demand for improved performance of heat-sensitive recording materials, such as no color development in the blank-paper portion and no color fading in the printed portion even when they come into contact with alcohol.

For example, Patent Literature (PTL) 1 proposes a heat-sensitive recording material containing a diarylurea derivative as a developer. However, the heat-sensitive recording material described in PTL 1 is insufficient in alcohol resistance, plasticizer resistance, and water plasticizer resistance, and has room for improvement.

CITATION LIST

Patent Literature

PTL 1: WO2019/044462

SUMMARY OF INVENTION

Technical Problem

A primary object of the present invention is to provide a heat-sensitive recording material that is excellent in alcohol resistance, plasticizer resistance, and water plasticizer resistance.

Solution to Problem

The present inventors carried out extensive research in view of the above prior art problem. As a result, the inventors have found a solution to the problem. More specifically, the present invention provides the following heat-sensitive recording materials.

Item 1.

A heat-sensitive recording material comprising an undercoat layer and a heat-sensitive recording layer in this order on a support, the undercoat layer containing hollow particles, a binder, and an inorganic pigment I, the heat-sensitive recording layer containing a leuco dye, a developer, and an inorganic pigment II, and the heat-sensitive recording layer containing an N,N'-diarylurea-based compound represented by the following formula (1):

(1)

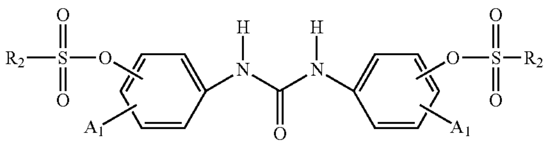

wherein $R_2$s may be the same or different, and each represents $C_{1-12}$ alkyl, $C_{7-12}$ aralkyl, or $C_{6-12}$ aryl, and the aralkyl and the aryl may be each substituted with $C_{1-12}$ alkyl, $C_{1-12}$ alkoxy, $C_{6-12}$ aryl, or halogen; $A_1$s may be the same or different, and each represents hydrogen or $C_{1-4}$ alkyl, as the developer, and a pigment with an oil absorption of 130 ml/100 g or less as the inorganic pigment II.

Item 2

The heat-sensitive recording material according to Item 1, wherein the content of the inorganic pigment I is 60 mass, or less, based on the total solids content of the undercoat layer.

Item 3

The heat-sensitive recording material according to Item 1 or 2, wherein the inorganic pigment I has an oil absorption of 130 ml/100 g or less.

Item 4

The heat-sensitive recording material according to any one of Items 1 to 3, wherein the inorganic pigment II is at least one member selected from the group consisting of calcium carbonate, aluminum hydroxide, and clay.

Item 5

The heat-sensitive recording material according to any one of Items 1 to 4, wherein the hollow particles have a maximum particle diameter (D100) of 10 to 40 μm and an average particle diameter (D50) of 4.0 to 15 μm, the ratio of the maximum particle diameter (D100) to the average particle diameter (D50), i.e., D100/D50, is 1.8 to 3.0, and the volume % of particles with a particle diameter of 2.0 μm or less is 1 or less.

Item 6

The heat-sensitive recording material according to any one of Items 1 to 5, wherein the hollow particles have a hollow ratio of 80 to 98%.

Item 7

The heat-sensitive recording material according to any one of Items 1 to 6, wherein the undercoat layer contains a binder having a glass transition temperature of −10° C. or less.

Item 8

The heat-sensitive recording material according to any one of Items 1 to 7, wherein the heat-sensitive recording layer further contains, as a second developer, at least one member selected from the group consisting of a urea-urethane compound represented by the following formula (2):

(2)

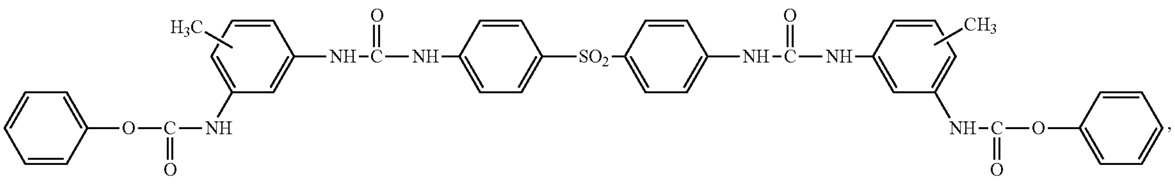

a crosslinked diphenylsulfone compound represented by the following formula (3):

(3)

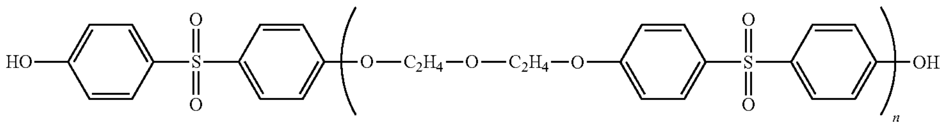

wherein n represents an integer of 1 to 6, and 4,4'-bis(3-tosylureido)diphenylmethane.

Item 9

The heat-sensitive recording material according to Item 8, wherein the content of the second developer is 0.2 to 3 parts by mass, per part by mass of the leuco dye.

Item 10

The heat-sensitive recording material according to any one of Items 1 to 9, wherein the N,N'-diarylurea-based compound represented by formula (1) is at least one member selected from the group consisting of N,N'-di-[3-(p-toluenesulfonyloxy)phenyl]urea, N,N'-di-[3-(o-toluenesulfonyloxy)phenyl]urea, N,N'-di-[3-(benzenesulfonyloxy)phenyl]urea, N,N'-di-[3-(mesitylenesulfonyloxy)phenyl]urea, N,N'-di-[3-(4-ethylbenzenesulfonyloxy)phenyl]urea, N,N'-di-[3-(2-naphthalenesulfonyloxy)phenyl]urea, N,N'-di-[3-(p-methoxybenzenesulfonyloxy)phenyl]urea, N,N'-di-[3-(benzylsulfonyloxy)phenyl]urea, N,N'-di-[3-(ethanesulfonyloxy)phenyl]urea, N,N'-di-[3-(p-toluenesulfonyloxy)-4-methyl-phenyl]urea, N,N'-di-[4-(p-toluenesulfonyloxy)phenyl]urea, N,N'-di-[4-(benzenesulfonyloxy)phenyl]urea, N,N'-di-[4-(ethanesulfonyloxy)phenyl]urea, and N,N'-di-[2-(p-toluenesulfonyloxy)phenyl]urea.

Item 11

The heat-sensitive recording material according to any one of Items 1 to 10, wherein the heat-sensitive recording material comprises an adhesive layer on at least one surface of the support.

Advantageous Effects of Invention

The heat-sensitive recording material of the present invention is excellent in alcohol resistance, plasticizer resistance, and water plasticizer resistance.

DESCRIPTION OF EMBODIMENTS

In the present specification, the expression “comprise” or “contain” includes the concepts of comprising, consisting essentially of, and consisting of.

In the present specification, a numerical range indicated by “ . . . to . . . ” means a range including the numerical values given before and after “to” as the lower limit and the upper limit.

“Latex” as used herein includes one in the form of a gel or dry film formed by drying a dispersion medium.

The present invention is directed to a heat-sensitive recording material comprising an undercoat layer and a heat-sensitive recording layer in this order on a support, the undercoat layer containing hollow particles, a binder, and an inorganic pigment I, the heat-sensitive recording layer containing a leuco dye, a developer, and an inorganic pigment II, the heat-sensitive recording layer containing an N,N'-diarylurea-based compound represented by the following formula (1):

(1)

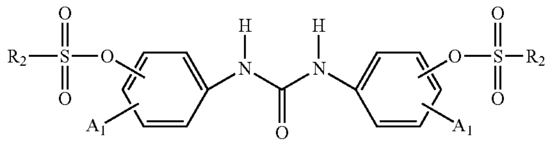

wherein $R_2$s may be the same or different, and each represents $C_{1-12}$ linear, branched, or alicyclic alkyl, $C_{7-12}$ aralkyl, or $C_{6-12}$ aryl, and the aralkyl and the aryl may be each substituted with $C_{1-12}$ alkyl, $C_{1-12}$ alkoxy, $C_{6-12}$ aryl, or halogen; $A_1$s may be the same or different, and each represents hydrogen or $C_{1-4}$ alkyl, as the developer, and a pigment with an oil absorption of 130 ml/100 g or less as the inorganic pigment II.

Support

The support in the present invention is not particularly limited in type, shape, dimension, or the like. For example, high-quality paper (acid paper, neutral paper), medium-quality paper, coated paper, art paper, cast-coated paper, glassine paper, resin laminate paper, polyolefin synthetic paper, synthetic fiber paper, nonwoven fabrics, synthetic resin films, various transparent supports, or the like, can be appropriately selected and used. The thickness of the support is not particularly limited, and is typically about 20 to 200 μm. The density of the support is not particularly limited, and is preferably about 0.60 to 0.85 g/cm$^3$.

Undercoat Layer

The heat-sensitive recording material of the present invention comprises an undercoat layer between a support and a heat-sensitive recording layer, and the undercoat layer contains hollow particles, a binder, and an inorganic pigment I.

Hollow Particles

The hollow particles are preferably formed of an organic resin from the viewpoint of enhancing cushioning properties. The undercoat layer, which contains the hollow particles and thus has excellent heat-insulating properties, can prevent the diffusion of heat applied to the heat-sensitive recording layer and increase the sensitivity of the heat-sensitive recording material.

Hollow particles formed of an organic resin can be divided into foamed and non-foamed types depending on the production method. Of these two types, foamed-type hollow particles typically have a larger average particle diameter and a higher hollow ratio than non-foamed-type hollow particles. Thus, foamed-type hollow particles allow for better sensitivity and image quality than non-foamed-type hollow particles.

Non-foamed-type hollow particles can be produced by polymerizing a seed in a solution, polymerizing another resin so as to cover the seed, and removing the seed inside by swelling and dissolving to form a void inside. An alkaline aqueous solution or the like is used to remove the seed inside by swelling and dissolving. Non-foamed-type hollow particles with a relatively large average particle diameter can also be produced by alkaline swelling treatment of core-shell particles in which core particles having alkaline swelling properties are coated with a shell layer that does not have alkaline swelling properties.

Foamed-type hollow particles can be produced by preparing particles in which a volatile liquid is sealed in a resin, and vaporizing and expanding the liquid in the particles while softening the resin by heating.

In the process of producing foamed-type hollow particles, the liquid in the particles is expanded by heating, thereby increasing the hollow ratio and providing excellent heat-insulating properties; thus, use of foamed-type hollow particles can enhance the sensitivity of the heat-sensitive recording material and improve the recording density. The improvement in sensitivity is particularly important in color development in a medium energy range, in which the thermal energy applied to the heat-sensitive recording layer is small. In addition, when the heat-sensitive recording layer is formed via an undercoat layer with excellent heat-insulating properties, the diffusion of heat applied to the heat-sensitive recording layer is prevented, resulting in excellent image uniformity and improved image quality. Thus, in this embodiment, it is preferable to use foamed-type hollow particles, which are suitable for improvement in the heat-insulating properties of the undercoat layer.

Examples of the resin that can be used for foamed-type hollow particles include thermoplastic resins, such as styrene-acrylic resins, polystyrene resins, acrylic resins, polyethylene resins, polypropylene resins, polyacetal resins, chlorinated polyether resins, polyvinyl chloride resins, polyvinylidene chloride resins, acrylic-based resins (e.g., an acrylic-based resin containing acrylonitrile as a component), styrene-based resins, vinylidene chloride-based resins, and copolymer resins mainly formed of polyvinylidene chloride and acrylonitrile. As gases contained in foamed-type hollow particles, propane, butane, isobutane, air, etc. can be typically used. Of the various resins, acrylonitrile resins and copolymer resins mainly formed of polyvinylidene chloride and acrylonitrile are preferred as resins that can be used for the hollow particles, from the viewpoint of the strength to maintain the shape of foamed particles.

The maximum particle diameter of the hollow particles in the present invention is preferably 10 to 40 μm, more preferably 10 to 30 μm, and even more preferably 15 to 25 μm. The maximum particle diameter is also referred to as "D100." When the maximum particle diameter of the hollow particles is 10 μm or more, the cushioning properties of the undercoat layer are improved; thus, the adhesion of the heat-sensitive recording material to a thermal head during printing is improved, and a heat-sensitive recording material with high image quality is obtained. This high image quality can result in improved recording density in a medium energy range, in which color is developed with energy lower than that for providing the maximum recording density (Dmax). When the maximum particle diameter of the hollow particles is 40 μm or less, the smoothness of the undercoat layer is improved; thus, the heat-sensitive recording layer provided via the undercoat layer can be made uniform, and a heat-sensitive recording material in which formation of white spots in an image is less likely to occur can be obtained.

The average particle diameter of the hollow particles in the present invention is preferably 4.0 to 15 μm, and more preferably 7.5 to 15 μm. The average particle diameter as used herein is the diameter at which the volume of larger particles is equal to the volume of smaller particles when particles are divided into two kinds based on the particle diameter, i.e., the median diameter, which is the particle diameter corresponding to 50 volume % frequency. The average particle diameter is also referred to as "D50." When the average particle diameter of the hollow particles is 4.0 μm or more, the cushioning properties of the undercoat layer are improved; thus, the adhesion of the heat-sensitive recording material to a thermal head during printing is improved, and a heat-sensitive recording material with high image quality is obtained. This high image quality can result in improved recording density in a medium energy range, in which color is developed with energy lower than that for providing the maximum recording density (Dmax). When the average particle diameter of the hollow particles is 15 μm or less, the smoothness of the undercoat layer is improved; thus, the heat-sensitive recording layer provided via the undercoat layer can be made uniform, and a heat-sensitive recording material in which formation of white spots in an image is less likely to occur can be obtained.

The maximum particle diameter (D100) and average particle diameter (D50) of the hollow particles can be measured using a laser diffraction particle diameter distribution analyzer. The average particle diameter (D50) may be shown according to the average value of particle diameters of 10 particles, the particle diameters being measured from the image of each particle with an electron microscope (SEM image).

The ratio of the maximum particle diameter (D100) of the hollow particles to the average particle diameter (D50) of the hollow particles, i.e., D100/D50, is an index showing the degree of particle diameter distribution. The D100/D50 ratio is preferably 1.8 to 3.0, and more preferably 2.0 to 2.8. When the D100/D50 ratio of the hollow particles is 1.8 or more, the hollow particles can be sufficiently foamed, the maximum particle diameter can be sufficiently large, the hollow ratio can be high, and the heat-insulating properties of the undercoat layer can be improved. When the D100/D50 ratio of the hollow particles is 3.0 or less, the sizes of the hollow particles are uniform, which improves the smoothness of the undercoat layer and suppresses white spots in an image.

In a particle diameter distribution determined with a laser diffraction particle diameter distribution analyzer, the volume % of hollow particles having a particle diameter of 2.0

μm or less is preferably 1% or less. It is also preferred that the volume % of hollow particles having a particle diameter of 2.0 μm or less is 0.5%, and it is more preferred that hollow particles having a particle diameter of 2.0 μm or less are not contained. Hollow particles having a particle diameter of 2 μm or less are considered to have a very small contribution to heat-insulating properties because they are too small to have a sufficient hollow area. When the volume % of hollow particles having a particle diameter of 2 μm or less in the undercoat layer is 1% or less, the recording density, image quality, etc. can be improved.

The hollow ratio of the hollow particles is preferably 80 to 98%, and more preferably 90 to 98%. When the hollow ratio of the hollow particles is 80% or more, excellent heat-insulating properties can be imparted to the undercoat layer containing the hollow particles. When the hollow ratio of the hollow particles is 98% or less, the strength of the film surrounding the hollow portion is improved, and thus hollow particles that do not collapse even when the undercoat layer is formed can be obtained.

The hollow ratio of the hollow particles is determined by measuring the true specific gravity according to the IPA method, and using the true specific gravity value as follows.

(1) Sample Pretreatment

A sample is dried at 60° C. around the clock.

(2) Reagent

Isopropyl alcohol (IPA: extra pure reagent)

(3) Measurement Method

A volumetric flask was weighed (W1).

About 0.5 g of the dried sample is weighed in the volumetric flask (W2).

About 50 mg of IPA is added thereto, and the volumetric flask is fully shaken to completely remove air outside the capsule.

IPA is added to the marked line, and the volumetric flask is weighed (W3).

As a blank, IPA alone is added to the marked line of a volumetric flask, and the volumetric flask is weighed (W4).

(4) Calculation of True Specific Gravity $$\text{True specific gravity}=\{(W2-W1)\times((W4-W1)/100)\}/\{(W4-W1)-(W3-W2)\}$$

(5) Calculation of Hollow Ratio $$\text{Hollow ratio (\%)}=\{1-1/(1.1/\text{true specific gravity})\}\times 100$$

The hollow ratio is a value that can also be determined according to the following formula: $(d^3/D^3)\times 100$. In the formula, d represents the inner diameter of the hollow particles, and D represents the outer diameter of the hollow particles.

Since the hollow particles in the present invention have a relatively large particle diameter, the content of the hollow particles in the undercoat layer can be reduced. The content of the hollow particles is preferably 3 to 40 mass %, and more preferably 5 to 35 mass %, based on the total solids content of the undercoat layer. A hollow particle content of 3 mass- or more can improve the heat-insulating properties of the undercoat layer, whereas a hollow particle content of 40 masse or less makes it less likely to cause problems in terms of coating properties and the like, and makes it possible to easily form a uniform undercoat layer and improve the recording density. Further, the coating film strength of the undercoat layer can be increased.

Binder

Examples of binders include water-soluble polymeric materials, such as polyvinyl alcohol and derivatives thereof, starch and derivatives thereof, cellulose derivatives, such as hydroxymethylcellulose, hydroxyethylcellulose, hydroxypropylcellulose, methylcellulose, and ethylcellulose, sodium polyacrylate, polyvinylpyrrolidone, acrylamide-acrylic acid ester copolymer, acrylamide-acrylic acid ester-methacrylic acid ester copolymer, styrene-maleic anhydride copolymer, isobutylene-maleic anhydride copolymer, casein, gelatin, and derivatives thereof; emulsions, such as polyvinyl acetate, polyurethane, polyacrylic acid, polyacrylic acid ester, vinyl chloride-vinyl acetate copolymer, polybutyl methacrylate, ethylene-vinyl acetate copolymer, and the like; latexes of water-insoluble polymers, such as styrene-butadiene copolymer and styrene-butadiene-acrylic copolymer; and the like. Of these, it is preferable to use a binder containing a latex. The content of the binder can be selected from a wide range, and is typically preferably about 20 to 70 mass %, and more preferably about 25 to 60 mass %, based on the total solids content of the undercoat layer.

The glass transition temperature (Tg) of the binder is not particularly limited, and is preferably −10° C. or less. When the glass transition temperature is −10° C. or less, image quality can be improved even in a low energy range. The glass transition temperature is more preferably −30° C. or less because image quality can be further improved in a low energy range. A glass transition temperature of −50° C. or less is not preferable because stickiness occurs. Thus, the glass transition temperature is preferably −40° C. or more.

Inorganic Pigment I

The undercoat layer of the present invention contains an inorganic pigment I. The oil absorption of the inorganic pigment I is preferably 130 ml/100 g or less, more preferably 125 ml/100 g or less, and even more preferably 110 ml/100 g or less, from the viewpoint of increasing recording density and improving water plasticizer resistance and alcohol resistance. The oil absorption of the inorganic pigment I is also preferably 50 ml/100 g or more, and more preferably 80 ml/100 g or more, from the viewpoint of effectively reducing printing problems such as head residue and sticking. The oil absorption is a value determined according to the method of JIS K 5101.

Various inorganic pigments can be used as the inorganic pigment I, and calcined kaolin, clay, etc. are preferred. The content of the inorganic pigment I is preferably 60 mass % or less, and more preferably 50 mass % or less, based on the total solids content of the undercoat layer, from the viewpoint of improving water plasticizer resistance and alcohol resistance. The content of the inorganic pigment I is also preferably 20 mass % or more, and more preferably 25 mass % or more, based on the total solids content of the undercoat layer, from the viewpoint of effectively reducing printing problems such as head residue and sticking.

The undercoat layer is formed on a support, for example, by mixing the hollow particles, the binder, and the inorganic pigment I, and if necessary, auxiliary agents, and the like using water as a medium to prepare a coating composition for an undercoat layer, applying the coating composition to the support, and then drying. The amount of the coating composition for an undercoat layer is not particularly limited, and is preferably about 2 to 20 $g/m^2$, and more preferably about 2 to 12 $g/m^2$ in terms of dry mass.

Heat-sensitive Recording Layer

Leuco Dye

The heat-sensitive recording layer of the heat-sensitive recording material of the present invention may contain any of various known colorless or pale-colored leuco dyes. Specific examples of such leuco dyes are described below.

Specific examples of leuco dyes include dyes capable of developing blue color, such as 3,3-bis(p-dimethylaminophenyl)-6-dimethylaminophthalide, 3-(4-diethylamino-2-methylphenyl)-3-(4-dimethylaminophenyl)-6-dimethylaminophthalide, and fluoran; dyes capable of developing green color, such as 3-(N-ethyl-N-p-tolyl)amino-7-N-methylanilinofluoran, 3-diethylamino-7-anilinofluoran, 3-diethylamino-7-dibenzylaminofluoran, and rhodamine B-anilinolactam; dyes capable of developing red color, such as 3,6-bis(diethylamino)fluoran-γ-anilinolactam, 3-cyclohexylamino-6-chlorofluoran, 3-diethylamino-6-methyl-7-chlorofluoran, and 3-diethylamino-7-chlorofluoran; dyes capable of developing black color, such as 3-(N-ethyl-N-isoamyl)amino-6-methyl-7-anilinofluoran, 3-(N-methyl-N-cyclohexyl)amino-6-methyl-7-anilinofluoran, 3-diethylamino-6-methyl-7-anilinofluoran, 3-di(n-butyl)amino-6-methyl-7-anilinofluoran, 3-di(n-pentyl)amino-6-methyl-7-anilinofluoran, 3-(N-ethyl-N-isoamylamino)-6-methyl-7-alininofluoran, 3-diethylamino-7-(m-trifluoromethylanilino) fluoran, 3-(N-isoamyl-N-ethylamino)-7-(o-chloroanilino) fluoran, 3-(N-ethyl-N-2-tetrahydrofurfurylamino)-6-methyl-7-anilinofluoran, 3-(N-n-hexyl-N-ethylamino)-6-methyl-7-anilinofluoran, 3-[N-(3-ethoxypropyl)-N-ethylamino]-6-methyl-7-anilinofluoran, 3-[N-(3-ethoxypropyl)-N-methylamino]-6-methyl-7-anilinofluoran, 3-diethylamino-7-(2-chloroanilino)fluoran, 3-di(n-butylamino)-7-(2-chloroanilino)fluoran, 4,4'-bis-dimethylaminobenzhydrinbenzyl ether, N-2,4,5-trichlorophenylleucooramine, 3-diethylamino-7-butylaminofluoran, 3-ethyltolylamino-6-methyl-7-anilinofluoran, 3-cyclohexylmethylamino-6-methyl-7-anilinofluoran, 3-diethylamino-6-chloro-7-(β-ethoxyethyl)aminofluoran, 3-diethylamino-6-chloro-7-(γ-chloropropyl)aminofluoran, 3-diethylamino-6-methyl-7-anilinofluoran, 3-(N-isoamyl-N-ethylamino)-6-methyl-7-anilinofluoran, 3-dibutylamino-7-chloroanilinofluoran, 3-diethylamino-7-(o-chlorophenylamino)fluoran, 3-(N-ethyl-p-toluidino)-6-methyl-7-anilinofluoran, 3-(N-ethyl-p-toluidino)-6-methyl-7-(p-toluidino)fluoran, 3-(N-ethyl-N-tetrahydrofurfurylamino)-6-methyl-7-anilinofluoran, 3-diethylamino-6-chloro-7-anilinofluoran, 3-dimethylamino-6-methyl-7-anilinofluoran, 3-pyrrolidino-6-methyl-7-anilinofluoran, 3-piperidino-6-methyl-7-anilinofluoran, 2,2-bis{4-(6'-(N-cyclohexyl-N-methylamino)-3'-methylspiro[phthalide-3,9'-xanthen-2'-ylamino]phenyl}propane, and 3-diethylamino-7-(3'-trifluoromethylphenyl)aminofluoran; dyes having absorption wavelengths in the near-infrared region, such as 3,3-bis[1-(4-methoxyphenyl)-1-(4-dimethylaminophenyl)ethylen-2-yl]-4,5,6,7-tetrachlorophthalide, 3,3-bis[1-(4-methoxyphenyl)-1-(4-pyrrolidinophenyl)ethylen-2-yl]-4,5,6,7-tetrachlorophthalide, 3-p-(p-dimethylaminoanilino)anilino-6-methyl-7-chlorofluoran, 3-p-(p-chloroanilino)anilino-6-methyl-7-chlorofluoran, and 3,6-bis (dimethylamino)fluorene-9-spiro-3'-(6'-dimethylamino) phthalide; and the like. Usable lueco dyes are, of course, not limited to these compounds, and two or more of such compounds can be used in combination as necessary.

The content of the leuco dye is not particularly limited, and is preferably about 3 to 30 mass %, more preferably about 5 to 25 mass %, and even more preferably about 7 to 20 mass %, based on the total solids content of the heat-sensitive recording layer. A leuco dye content of 3 mass- or more can enhance color development ability and thus improve recording density, whereas a leuco dye content of 30 mass % or less can enhance heat resistance.

Developer

In the present invention, an N,N'-diarylurea-based compound represented by formula (1) is contained as a developer. Use of the N,N'-diarylurea-based compound makes it possible to exhibit excellent alcohol resistance, plasticizer resistance, water plasticizer resistance, etc.

The $C_{1-12}$ alkyl represented by $R_2$ may be linear, branched, or alicyclic, and is preferably $C_{1-6}$ alkyl, and more preferably $C_{1-3}$ alkyl. Examples of $C_{1-12}$ alkyl include methyl, ethyl, n-propyl, i-propyl, n-butyl, i-butyl, t-butyl, cyclopentyl, hexyl, cyclohexyl, 2-ethylhexyl, lauryl, and the like. The alkyl as used herein includes the alkyl moiety of $C_{1-12}$ alkoxy.

"Aralkyl" means arylalkyl. Examples of $C_{7-12}$ aralkyl include benzyl, 1-phenylethyl, 2-phenylethyl, 3-phenylpropyl, and the like.

"Aryl" means a monocyclic or polycyclic group formed of a 5- or 6-membered aromatic hydrocarbon ring. Examples of $C_{6-12}$ aryl include phenyl, 1-naphthyl, 2-naphthyl, and the like. The aryl as used herein includes the aryl moiety of aralkyl.

Examples of halogen include fluorine, chlorine, bromine, and iodine.

In formula (1), the substitution position of each $R_2$—$SO_3$— may be the same or different. The substitution position is preferably the 3-position, the 4-position, or the 5-position, and more preferably the 3-position. When the $C_{7-12}$ aralkyl and the $C_{6-12}$ aryl represented by $R_2$ are substituted, the number of substituents is not particularly limited, and is for example, 1 to 4.

The $C_{1-4}$ alkyl represented by $A_1$ may be linear or branched. Examples include methyl, ethyl, propyl, isopropyl, butyl, isobutyl, sec-butyl, t-butyl, and the like.

The substitution position of each $A_1$ may be the same or different. The substitution position is preferably the 3-position, the 4-position, or the 5-position.

The N,N'-diarylurea-based compound represented by formula (1) is not particularly limited, and is preferably at least one member selected from the group consisting of N,N'-di-[3-(p-toluenesulfonyloxy)phenyl]urea, N,N'-di-[3-(o-toluenesulfonyloxy)phenyl]urea, N,N'-di-[3-(benzenesulfonyloxy)phenyl]urea, N,N'-di-[3-(mesitylenesulfonyloxy) phenyl]urea, N,N'-di-[3-(4-ethylbenzenesulfonyloxy) phenyl]urea, N,N'-di-[3-(2-naphthalenesulfonyloxy)phenyl] urea, N,N'-di-[3-(p-methoxybenzenesulfonyloxy)phenyl] urea, N,N'-di-[3-(benzylsulfonyloxy)phenyl]urea, N,N'-di-[3-(ethanesulfonyloxy)phenyl]urea, N,N'-di-[3-(p-toluenesulfonyloxy)-4-methyl-phenyl]urea, N,N'-di-[4-(p-toluenesulfonyloxy)phenyl]urea, N,N'-di-[4-(benzenesulfonyloxy)phenyl]urea, N,N'-di-[4-(ethanesulfonyloxy)phenyl]urea, and N,N'-di-[2-(p-toluenesulfonyloxy)phenyl]urea. Of these, N,N'-di-[3-(p-toluenesulfonyloxy)phenyl]urea is preferred.

The content of the N,N'-diarylurea-based compound is not particularly limited and can be adjusted in accordance with the leuco dye used. The content of the N,N'-diarylurea-based compound is typically preferably 0.5 parts by mass or more, more preferably 0.8 parts by mass or more, even more preferably 1 part by mass or more, still even more preferably 1.2 parts by mass or more, and particularly preferably 1.5 parts by mass or more, per part by mass of the leuco dye. The content of the N,N'-diarylurea-based compound is also preferably 10 parts by mass or less, more preferably 5 parts by mass or less, even more preferably 4 parts by mass or less, and particularly preferably 3.5 parts by mass or less, per part by mass of the leuco dye. An N,N'-diarylurea-based compound content of 0.5 parts by mass or more can enhance recording performance, whereas an N,N'-diarylurea-based compound content of 10 parts by mass or less can effectively suppress background fogging in a high-temperature environment.

The heat-sensitive recording layer of the present invention preferably further contains, as a second developer, at least one member selected from the group consisting of urea-urethane compounds represented by formula (2), such as 4,4'-bis[(4-methyl-3-phenoxycarbonylaminophenyl)ureido] diphenylsulfone, 4,4'-bis[(2-methyl-5-phenoxycarbonylaminophenyl)ureido]diphenylsulfone, and 4-(2-methyl-3-phenoxycarbonylaminophenyl)ureido-4'-(4-methyl-5-phenoxycarbonylaminophenyl)ureidodiphenylsulfone, crosslinked diphenylsulfone compounds represented by formula (3), and 4,4'-bis(3-tosylureido)diphenylmethane. Use of the second developer can further improve water plasticizer resistance. The content of the second developer is preferably about 0.2 to 3 parts by mass, per part by mass of the leuco dye. The content of the second developer is also preferably about 0.2 to 0.5 parts by mass, per part by mass of the N,N'-diarylurea-based compound used as the first developer.

Other developers may be contained as long as the effect of the invention is not impaired. Specific examples of the other developers include phenolic compounds, such as 4-tert-butylphenol, 4-acetylphenol, 4-tert-octylphenol, 4,4'-sec-butylidenediphenol, 4-phenylphenol, 4,4'-dihydroxydiphenylmethane, 4,4'-isopropylidenediphenol, 4,4'-cyclohexylidenediphenyl, 4,4'-cyclohexylidenediphenol, 1,1-bis(4-hydroxyphenyl)-ethane, 1,1-bis(4-hydroxyphenyl)-1-phenylethane, 4,4'-bis(p-tolylsulfonylaminocarbonylamino) diphenylmethane, 1,1-bis(4-hydroxyphenyl)cyclohexane, 2,2'-bis[4-(4-hydroxyphenyl)phenoxy]diethyl ether, 4,4'-dihydroxydiphenylsulfide, 4,4'-thiobis(3-methyl-6-tert-butylphenol), 4,4'-dihydroxydiphenylsulfone, 2,4'-dihydroxydiphenylsulfone, 2,2-bis(4-hydroxyphenyl)-4-methylpentane, 2,4'-dihydroxydiphenylsulfone, 4-hydroxy-4'-isopropoxydiphenylsulfone, 4-hydroxy-4'-n-propoxydiphenylsulfone, 4-hydroxy-4'-allyloxydiphenylsulfone, 4-hydroxy-4'-benzyloxydiphenylsulfone, 3,3'-diallyl-4,4'-dihydroxydiphenylsulfone, butyl bis(p-hydroxyphenyl) acetate, methyl bis(p-hydroxyphenyl)acetate, hydroquinone monobenzyl ether, bis(3-allyl-4-hydroxyphenyl)sulfone, 4-hydroxy-4'-methyldiphenylsulfone, 4-allyloxy-4'-hydroxydiphenylsulfone, 3,4-dihydroxyphenyl-4'-methylphenylsulfone, 4-hydroxybenzophenenone, dimethyl 4-hydroxyphthalate, methyl 4-hydroxybenzoate, propyl 4-hydroxybenzoate, sec-butyl 4-hydroxybenzoate, phenyl 4-hydroxybenzoate, benzyl 4-hydroxybenzoate, 4-hydroxybenzoic acid benzyl ester, tolyl 4-hydroxybenzoate, chlorophenyl 4-hydroxybenzoate, and 4,4'-dihydroxydiphenyl ether; aromatic carboxylic acids, such as benzoic acid, p-chlorobenzoic acid, p-tert-butylbenzoic acid, tolylchlorobenzoic acid, terephthalic acid, salicylic acid, 3-tert-butylsalicylic acid, 3-isopropylsalicylic acid, 3-benzylsalicylic acid, 3-($\alpha$-methylbenzyl)salicylic acid, 3,5-di-tert-butylsalicylic acid, 4-[2-(p-methoxyphenoxy)ethyloxy]salicylic acid, 4-[3-(p-tolylsulfonyl)propyloxy]salicylic acid, 5-[p-(2-p-methoxyphenoxyethoxy)cumyl]salicylic acid, and zinc 4-[3-(p-tolylsulfonyl)propyloxy]salicylate; salts of these phenolic compounds or aromatic carboxylic acids with, for example, polyvalent metals, such as zinc, magnesium, aluminum, calcium, titanium, manganese, tin, and nickel; antipyrine complex of zinc thiocyanate; organic acidic substances, such as composite zinc salts of terephthalic aldehyde acid and other aromatic carboxylic acids; thiourea compounds, such as N-p-toluenesulfonyl-N'-3-(p-toluenesulfonyloxy)phenylurea, N-p-toluenesulfonyl-N'-p-butoxycarbonylphenylurea, N-p-tolylsulfonyl-N'-phenylurea, and N,N'-di-m-chlorophenylthiourea; organic compounds having a —$SO_2NH$— bond in the molecule, such as N-(p-toluenesulfonyl)carbamic acid p-cumylphenyl ester, N-(p-toluenesulfonyl)carbamic acid p-benzyloxyphenyl ester, N-[2-(3-phenylureido)phenyl]benzenesulfonamide, and N-(o-toluoyl)-p-toluenesulfoamide; inorganic acidic substances, such as activated clay, attapulgite, colloidal silica, and aluminum silicate; and the like. The content of the other developers is not particularly limited, and is preferably 0.2 parts by mass or less, and more preferably 0.1 parts by mass or less, per part by mass of the N,N'-diarylurea-based compound used as the first developer.

Inorganic Pigment II

The heat-sensitive recording layer of the present invention contains a pigment with an oil absorption of 130 ml/100 g or less as an inorganic pigment II. The oil absorption of the inorganic pigment II is preferably 125 ml/100 g or less, more preferably 100 ml/100 g or less, even more preferably 60 ml/100 g or less, particularly preferably 50 ml/100 g or less, and most preferably 45 ml/100 g or less. Use of the inorganic pigment II can significantly increase alcohol resistance, plasticizer resistance, and water plasticizer resistance. From the viewpoint of effectively reducing printing problems such as head residue and sticking, the oil absorption of the inorganic pigment II is preferably 30 ml/100 g or more. The heat-sensitive recording layer of the present invention may contain a pigment with an oil absorption of more than 130 ml/100 g as long as the effect of the present invention is not impaired. The content of the pigment with an oil absorption of more than 130 ml/100 g is preferably 0.5 parts by mass or less, more preferably 0.3 parts by mass or less, and even more preferably 0.1 parts by mass or less, per part by mass of the pigment with an oil absorption of 130 ml/100 g or less. It is particularly preferred that the heat-sensitive recording layer does not contain a pigment with an oil absorption of more than 130 ml/100 g. The oil absorption is a value determined according to the method of JIS K 5101.

Various inorganic pigments can be used as the inorganic pigment II. Specific examples include inorganic pigments, such as calcium carbonate such as light calcium carbonate, aluminum hydroxide, clay such as kaolin, and talc. Of these, the inorganic pigment II is preferably at least one member selected from the group consisting of calcium carbonate, aluminum hydroxide, and clay. The type of inorganic pigment II may be different from or the same as the inorganic pigment I. The content of the inorganic pigment II can be selected from a wide range, and is preferably 10 to 50 mass %, more preferably 10 to 40 mass %, and even more preferably 15 to 35 mass %, based on the total solids content of the heat-sensitive recording layer.

In the present invention, the heat-sensitive recording layer may further contain a stabilizer mainly in order to further enhance the preservation of the developed color image. As such a stabilizer, it is possible to use, for example, at least one member selected from the group consisting of phenol compounds, such as 1,1,3-tris(2-methyl-4-hydroxy-5-cyclohexylphenyl)butane, 1,1,3-tris(2-methyl-4-hydroxy-5-tert-butylphenyl)butane, 1,1-bis(2-methyl-4-hydroxy-5-tert-butylphenyl)butane, 4,4'-[1,4-phenylenebis(1-methylethylidene)]bisphenol, and 4,4'-[1,3-phenylenebis(1-methylethylidene)]bisphenol; epoxy compounds, such as 4-benzyloxyphenyl-4'-(2-methyl-2,3-epoxypropyloxy)phenylsulfone, 4-(2-methyl-1,2-epoxyethyl)diphenylsulfone, and 4-(2-ethyl-1,2-epoxyethyl)diphenylsulfone; and isocyanuric acid compounds, such as 1,3,5-tris(2,6-dimethylbenzyl-3-hydroxy-4-tert-butyl)isocyanuric acid. Usable stabilizers are, of course, not limited to these compounds, and two or more of such compounds can be used in combination as necessary.

When the stabilizer is used, its amount may be an effective amount for improving image preservation. The stabilizer is typically preferably used in an amount of about 1 to 25 mass %, and more preferably about 5 to 20 mass %, based on the total solids content of the heat-sensitive recording layer.

In the present invention, the heat-sensitive recording layer may further contain a sensitizer. Use of the sensitizer enhances the recording sensitivity. Examples of usable sensitizers include stearic acid amide, methoxycarbonyl-N-stearic acid benzamide, N-benzoyl stearic acid amide, N-eicosanoic acid amide, ethylenebisstearic acid amide, behenic acid amide, methylenebisstearic acid amide, N-methylol stearic acid amide, dibenzyl terephthalate, dimethyl terephthalate, dioctyl terephthalate, diphenylsulfone, benzyl p-benzyloxybenzoate, phenyl 1-hydroxy-2-naphthoate, 2-naphthyl benzyl ether, m-terphenyl, p-benzylbiphenyl, oxalic acid-di-p-chlorobenzyl ester, oxalic acid-di-p-methylbenzyl ester, oxalic acid-dibenzyl ester, p-tolyl biphenyl ether, di(p-methoxyphenoxyethyl)ether, 1,2-di(3-methylphenoxy)ethane, 1,2-di(4-methylphenoxy)ethane, 1,2-di (4-methoxyphenoxy)ethane, 1,2-di(4-chlorophenoxy)ethane, 1,2-diphenoxyethane, 1-(4-methoxyphenoxy)-2-(3-methylphenoxy)ethane, p-methylthiophenylbenzylether, 1,4-di(phenylthio)butane, p-acetotoluidide, p-acetophenetidide, N-acetoacetyl-p-toluidine, 1,2-diphenoxymethylbenzene, di((3-biphenylethoxy)benzene, p-di(vinyloxyethoxy) benzene, 1-isopropylphenyl-2-phenylethane, di-o-chlorobenzyl adipate, 1,2-bis(3,4-dimethylphenyl)ethane, 1,3-bis(2-naphthoxy)propane, diphenyl, benzophenone, and the like. Of these, 1,2-di(3-methylphenoxy)ethane is preferred from the viewpoint of obtaining a sensitizing effect without reducing water plasticizer resistance and alcohol resistance. These sensitizers can be used in combination as long as the combined use does not impair the effect of the present invention. The sensitizer content may be an effective amount for sensitization, and is typically preferably 2 to 25 mass, more preferably 5 to 20 mass %, and even more preferably 5 to 15 mass %, based on the total solids content of the heat-sensitive recording layer.

As other components that constitute the heat-sensitive recording layer, a binder can be used. Further, if necessary, auxiliary agents, such as crosslinking agents, waxes, metal soaps, water resistance improving agents, dispersants, colored dyes, and fluorescent dyes can be used.

Examples of binders include water-soluble polymeric materials, such as polyvinyl alcohol and derivatives thereof, starch and derivatives thereof, cellulose derivatives, such as hydroxymethylcellulose, hydroxyethylcellulose, hydroxypropylcellulose, methylcellulose, and ethylcellulose, sodium polyacrylate, polyvinylpyrrolidone, acrylamide-acrylic acid ester copolymer, acrylamide-acrylic acid ester-methacrylic acid ester copolymer, styrene-maleic anhydride copolymer, isobutylene-maleic anhydride copolymer, casein, gelatin, and derivatives thereof; emulsions, such as polyvinyl acetate, polyurethane, polyacrylic acid, polyacrylic acid ester, vinyl chloride-vinyl acetate copolymer, polybutyl methacrylate, ethylene-vinyl acetate copolymer, and the like; latexes of water-insoluble polymers, such as styrene-butadiene copolymer and styrene-butadiene-acrylic copolymer; and the like. Of these, polyvinyl alcohol, latexes, and the like are preferred. The content of the binder can be selected from a wide range, and is typically preferably about 5 to 30 mass, and more preferably about 10 to 20 mass %, based on the total solids content of the heat-sensitive recording layer.

When the heat-sensitive recording layer contains a crosslinking agent, the water resistance of the heat-sensitive recording layer can be improved. Examples of crosslinking agents include aldehyde compounds, such as glyoxal; polyamine compounds, such as polyethyleneimine; epoxy compounds, polyamide resins, melamine resins, glyoxylic acid salts, dimethylolurea compounds, aziridine compounds, block isocyanate compounds; and inorganic compounds, such as ammonium persulfate, ferric chloride, magnesium chloride, soda tetraborate, and potassium tetraborate; and boric acid, boric acid triesters, boron polymers, hydrazide compounds, glyoxylic acid salts, and the like. These may be used singly, or in a combination of two or more. The amount of the crosslinking agent used is preferably about 1 to 5 mass %, based on the total solids content of the heat-sensitive recording layer.

The heat-sensitive recording layer is formed on the undercoat layer, for example, by dispersing a leuco dye and a developer, and if necessary, with or separately from a sensitizer and a stabilizer, using water as a dispersion medium and using at least one of various stirrers or wet pulverizers, such as a ball mill, a co-ball mill, an attritor, or a vertical or horizontal sand mill together with a water-soluble synthetic polymer compound, such as polyacrylamide, polyvinyl pyrrolidone, polyvinyl alcohol, methylcellulose, or a styrene-maleic anhydride copolymer salt, and other additives such as a surfactant to form dispersions; then mixing the dispersions obtained by reducing the average particle diameter so that the average particle diameter is 2 μm or less, with the inorganic pigment II, and optionally further mixing therewith a binder, an auxiliary agent, and the like to prepare a coating composition for a heat-sensitive recording layer; applying the coating composition for a heat-sensitive recording layer to the undercoat layer and then drying. The coated amount of the heat-sensitive recording layer is not particularly limited and is preferably about 1 to 12 $g/m^2$, more preferably 2 to 10 $g/m^2$, even more preferably 2.5 to 8 $g/m^2$, and particularly preferably 3 to 5.5 $g/m^2$, in terms of the coated amount after drying. Note that the heat-sensitive recording layer may be formed as two or more separate layers if necessary, and the composition and coated amount of each layer may be the same or different.

Protective Layer

The heat-sensitive recording material can comprise a protective layer formed on the heat-sensitive recording layer as necessary. The protective layer preferably contains a pigment and a binder. The protective layer preferably further contains a lubricant, such as polyolefin wax or zinc stearate, for the purpose of preventing the layer from sticking to the thermal head. The protective layer can also contain a UV absorber. When a glossy protective layer is formed, the obtained product can have increased added value.

The pigment contained in the protective layer is not particularly limited. Examples include inorganic pigments, such as amorphous silica, kaolin, clay, light calcium carbonate, ground calcium carbonate, calcined kaolin, titanium oxide, magnesium carbonate, aluminum hydroxide, colloidal silica, and synthetic layered mica; plastic pigments, such as urea-formalin resin fillers; and the like.

The binder contained in the protective layer is not particularly limited, and an aqueous binder selected from water-soluble binders and water-dispersible binders can be used. The binder can be appropriately selected from those that can be used for the heat-sensitive recording layer. Of these binders, more preferred are modified polyvinyl alcohols, such as acetoacetyl-modified polyvinyl alcohol, carboxy-modified polyvinyl alcohol, and diacetone-modified polyvinyl alcohol.

The protective layer is formed on the heat-sensitive recording layer, for example, by mixing a pigment and a binder optionally with an auxiliary agent and the like using water as a dispersion medium to prepare a coating composition for a protective layer, applying the coating composition to the heat-sensitive recording layer, and then drying. The coated amount of the coating composition for a protective layer is not particularly limited and is preferably about 0.3 to 15 $g/m^2$, more preferably about 0.3 to 10 $g/m^2$, even more preferably about 0.5 to 8 $g/m^2$, particularly preferably about 1 to 8 $g/m^2$, and further particularly preferably about 1 to 5 $g/m^2$, in terms of dry mass. The protective layer may be formed as two or more separate layers if necessary, and the composition and coated amount of each layer may be the same or different.

Other Layers

In the present invention, the heat-sensitive recording material preferably comprises an adhesive layer on at least one surface of the support. This can increase the added value of the heat-sensitive recording material. For example, adhesive paper, remoistening adhesive paper, or delayed tack paper can be formed as the adhesive layer by subjecting one surface of the support to coating with, for example, an adhesive, such as an adhesive, a remoistening adhesive, or a delayed tack adhesive. Recording paper capable of two-sided recording can also be formed by imparting to the surface of the support opposite to the heat-sensitive recording layer a function as heat transfer paper, ink jet recording paper, carbon-free paper, electrostatic recording paper, or xerography paper. Of course, the heat-sensitive recording material can be formed into a two-side heat-sensitive recording material. A back layer can also be provided to inhibit oil and plasticizer permeation from the back side of the heat-sensitive recording material, or for curl control and antistatic purposes. The heat-sensitive recording material can also be formed into linerless labels that do not require release paper by forming a silicone-containing release layer on the protective layer and applying an adhesive to the one side.

Heat-Sensitive Recording Material

The heat-sensitive recording material can be produced by forming each layer described above on the support. Any known coating method, such as an air knife method, a blade method, a gravure method, a roll coater method, a spray method, a dip method, a bar method, a curtain method, a slot-die method, a slide die method, and an extrusion method, can be used as the method for forming each layer described above on the support. The individual coating compositions may be applied in such a manner that a first coating composition is applied and dried and then a second coating composition is applied and dried to form one layer after another, or the same coating composition may be applied separately to form two or more layers. Further, simultaneous multilayer coating may also be performed, in which individual coating compositions are applied all at once to form two or more layers simultaneously. After each layer is formed or in any stage after all layers are formed, the layer may be subjected to a smoothing treatment by a known method, such as supercalendering or soft calendering.

EXAMPLES

The present invention is described below in more detail with reference to Examples. However, the present invention is not limited to these Examples. In the Examples, "parts" and "%" represent "parts by mass" and "masses" unless otherwise specified. The particle diameters, such as the average particle diameter and the maximum particle diameter, were measured using a SALD2200 laser diffraction particle diameter distribution analyzer (produced by Shimadzu Corporation). "Average particle diameter" as used herein refers to the median diameter (D50).

The hollow particles used in the Examples and Comparative Example are as follows.

Hollow particles A: average particle diameter (D50): 5.0 μm; maximum particle diameter (D100): 13.5 μm; hollow ratio: 90%, proportion of particles having a particle diameter of 2 μm or less: 0.2 volume %; solids content: 15.0%; foamed type.

Hollow particles B: average particle diameter (D50): 11 μm; maximum particle diameter (D100): 23 μm; hollow ratio: 93%; proportion of particles having a particle diameter of 2 μm or less: 0 volume %; solids content: 15.0%; foamed type.

Hollow particles C: trade name: Ropaque SN-1055, produced by The Dow Chemical Company; average particle diameter (D50): 1.0 μm; maximum particle diameter (D100): 1.8 μm; hollow ratio: 55%; proportion of particles having a particle diameter of 2 μm or less: 100 volume %; solids content: 26.5%; non-foamed type. The average particle diameters (D50) and maximum particle diameters (D100) of these hollow particles were measured using a SALD2200 laser diffraction particle diameter distribution analyzer (produced by Shimadzu Corporation) at a refractive index of 1.70-0.01i.

The latexes used in the Examples and Comparative Example are as follows.

Latex A: styrene-butadiene copolymer latex development product (Tg: −35° C.; particle diameter: 300 nm; solids content: 48%)

Latex B: styrene-butadiene copolymer latex development product (Tg: −10° C.; particle diameter: 190 nm; solids content: 48%)

Latex C: styrene-butadiene copolymer latex (trade name: L-1571, produced by Asahi Kasei Corporation; Tg: −3° C.; particle diameter: 190 nm; solids content: 48%)

The inorganic pigments II used in the Examples and Comparative Example are as follows.

Aluminum hydroxide: trade name: Higilite H-42, produced by Showa Denko K.K.; oil absorption: 43 ml/100 g Calcium carbonate: trade name: Brilliant-15, produced by Shiraishi Kogyo Kaisha, Ltd.; oil absorption: 56 ml/100 g Clay: trade name: Hydragloss 90, produced by KaMin LLC; oil absorption: 46 ml/100 g Amorphous silica: trade name: Nipsil E743, produced by Tosoh Silica Corporation; oil absorption: 160 ml/100 g

Example 1

(1) Preparation of Coating Composition for Undercoat Layer

A coating composition for an undercoat layer was prepared by mixing and stirring 100 parts of hollow particles A, 38 parts of calcined kaolin (trade name: Ansilex 93, produced by BASF; oil absorption: 105 ml/100 g) as inorganic pigment I, 79.2 parts of latex A, 32 parts of a 25% solution of oxidized starch, 1.1 parts of carboxymethyl cellulose (trade name: Cellogen AG gum, produced by DKS Co., Ltd.), and 100 parts of water.

(2) Preparation of Leuco Dye Dispersion (Liquid A)

40 parts of 3-di(n-butyl)amino-6-methyl-7-anilinofluoran, 40 parts of a 10% aqueous solution of polyvinyl alcohol (degree of polymerization: 500; degree of saponification: 88%), and 20 parts of water were mixed. The resulting mixture was pulverized with a sand mill (produced by Imex Co., Ltd., a sand grinder) to an average particle diameter of 0.5 μm, thus obtaining a leuco dye dispersion (liquid A).

(3) Preparation of Developer Dispersion (Liquid B)

40 parts of N,N'-di-[3-(p-toluenesulfonyloxy)phenyl] urea, 40 parts of a 10% aqueous solution of polyvinyl alcohol (degree of polymerization: 500; degree of saponification: 88%), and 20 parts of water were mixed. The resulting mixture was pulverized with a sand mill (produced by Imex Co., Ltd., a sand grinder) to an average particle diameter of 1.0 μm, thus obtaining a developer dispersion (liquid B).

(4) Preparation of Sensitizer Dispersion (Liquid C)

40 parts of 1,2-di(3-methylphenoxy)ethane (trade name: KS-232, produced by Sankosha Co., Ltd.), 40 parts of a 10% aqueous solution of polyvinyl alcohol (degree of polymerization: 500; degree of saponification: 88%), and 20 parts of water were mixed. The resulting mixture was pulverized with a sand mill (produced by Imex Co., Ltd., a sand grinder) to an average particle diameter of 1.0 μm, thus obtaining a sensitizer dispersion (liquid C).

(5) Preparation of Coating Composition for Heat-Sensitive Recording Layer

A coating composition for a heat-sensitive recording layer was prepared by mixing and stirring 31.8 parts of liquid A, 63.6 parts of liquid B, 22.7 parts of liquid C, 46.7 parts of a 15% aqueous solution of completely saponified polyvinyl alcohol (trade name: PVA110; degree of saponification: 99 mol %; average degree of polymerization: 1000; produced by Kuraray Co., Ltd.), 14.6 parts of a styrene-butadiene copolymer latex (trade name: L-1571; produced by Asahi Kasei Corporation; solids content: 48%), 32 parts of aluminum hydroxide (trade name: Higilite H-42, produced by Showa Denko K.K.), 2 parts of adipic acid dihydrazide (produced by Otsuka Chemical Co., Ltd.), and 200 parts of water.

(6) Preparation of Coating Composition for Protective Layer

A composition comprising 300 parts of a 12% aqueous solution of diacetone-modified polyvinyl alcohol (trade name: DF-10, produced by Japan Vam & Poval Co., Ltd.), 62 parts of clay (trade name: Hydragloss 90, produced by KaMin LLC), 0.5 parts of polyethylene wax (trade name: Chemipearl W-400, produced by Mitsui Chemicals Inc.; solids content: 40%), 5 parts of zinc stearate (trade name: Hidorin Z-8-36, produced by Chukyo Yushi Co., Ltd.; solids content: 36%), and 150 parts of water was mixed and stirred to obtain a coating composition for a protective layer.

(7) Production of Heat-sensitive Recording Material

The coating composition for an undercoat layer, the coating composition for a heat-sensitive recording layer, and the coating composition for a protective layer were applied in amounts after drying of 4.5 g/m, 3.5 g/m, and 2.5 g/$m^2$, respectively, to one surface of high-quality paper having a basis weight of 60 g/$m^2$, and dried to form an undercoat layer, a heat-sensitive recording layer, and a protective layer in this order. The obtained product was then super-calendered to smooth the surface, thus obtaining a heat-sensitive recording material.

Example 2

A heat-sensitive recording material was obtained in the same manner as in Example 1 except that in the preparation of the coating composition for a heat-sensitive recording layer, calcium carbonate (trade name: Brilliant-15, produced by Shiraishi Kogyo Kaisha, Ltd.) was used in place of aluminum hydroxide.

Example 3

A heat-sensitive recording material was obtained in the same manner as in Example 1 except that in the preparation of the coating composition for a heat-sensitive recording layer, clay (trade name: Hydragloss 90, produced by KaMin LLC) was used in place of aluminum hydroxide.

Example 4

A heat-sensitive recording material was obtained in the same manner as in Example 1 except that in the preparation of the coating composition for an undercoat layer, hollow particles A were used in an amount of 46.7 parts in place of 100 parts, calcined kaolin was used in an amount of 46.0 parts in place of 38.0 parts, and water was used in an amount of 145 parts in place of 100 parts.

Example 5

A heat-sensitive recording material was obtained in the same manner as in Example 1 except that in the preparation of the coating composition for an undercoat layer, latex B was used in place of latex A.

Example 6

A heat-sensitive recording material was obtained in the same manner as in Example 1 except that in the preparation of the coating composition for an undercoat layer, latex C was used in place of latex A.

Example 7

A heat-sensitive recording material was obtained in the same manner as in Example 1 except that in the preparation of the coating composition for an undercoat layer, hollow particles B were used in place of hollow particles A.

Example 8

A heat-sensitive recording material was obtained in the same manner as in Example 1 except that in the preparation of the coating composition for a heat-sensitive recording layer, liquid C was used in an amount of 45.5 parts in place of 22.7 parts, aluminum hydroxide was used in an amount of 22 parts in place of 32 parts, and water was used in an amount of 190 parts in place of 200 parts.

Example 9

Preparation of Developer Dispersion (Liquid D)

40 parts of 4,4'-bis(3-tosylureido)diphenylmethane, 40 parts of a 10% aqueous solution of polyvinyl alcohol (degree of polymerization: 500; degree of saponification: 88') and 20 parts of water were mixed. The resulting mixture was pulverized with a sand mill (produced by Imex Co., Ltd., a sand grinder) to an average particle diameter of 1.0 μm, thus obtaining a developer dispersion (liquid D).

A heat-sensitive recording material was obtained in the same manner as in Example 1 except that in the preparation of the coating composition for a heat-sensitive recording layer, 22.7 parts of liquid D was further added, aluminum hydroxide was used in an amount of 22 parts in place of 32 parts, and water was used in an amount of 180 parts in place of 200 parts.

Example 10

Preparation of Developer Dispersion (Liquid E)

40 parts of a urea-urethane compound represented by formula (2), 40 parts of a 10% aqueous solution of polyvinyl alcohol (degree of polymerization: 500; degree of saponification: 88%), and 20 parts of water were mixed. The resulting mixture was pulverized with a sand mill (produced by Imex Co., Ltd., a sand grinder) to an average particle diameter of 1.0 μm, thus obtaining a developer dispersion (liquid E).

A heat-sensitive recording material was obtained in the same manner as in Example 1 except that in the preparation of the coating composition for a heat-sensitive recording layer, 22.7 parts of liquid E was further added, aluminum hydroxide was used in an amount of 22 parts in place of 32 parts, and water was used in an amount of 180 parts in place of 200 parts.

Example 11

Preparation of Developer Dispersion (Liquid F)

40 parts of a crosslinked diphenylsulfone compound represented by formula (3), 40 parts of a 10% aqueous solution of polyvinyl alcohol (degree of polymerization: 500; degree of saponification: 88%), and 20 parts of water were mixed. The resulting mixture was pulverized with a sand mill (produced by Imex Co., Ltd., a sand grinder) to an average particle diameter of 1.0 μm, thus obtaining a developer dispersion (liquid F).

A heat-sensitive recording material was obtained in the same manner as in Example 1 except that in the preparation of the coating composition for a heat-sensitive recording layer, 22.7 parts of liquid F was further added, aluminum hydroxide was used in an amount of 22 parts in place of 32 parts, and water was used in an amount of 180 parts in place of 200 parts.

Example 12

A heat-sensitive recording material was obtained in the same manner as in Example 1 except that in the preparation of the coating composition for a heat-sensitive recording layer, liquid C was used in an amount of 0 parts in place of 22.7 parts, aluminum hydroxide was used in an amount of 42 parts in place of 32 parts, and water was used in an amount of 210 parts in place of 200 parts.

Example 13

A heat-sensitive recording material was obtained in the same manner as in Example 1 except that in the preparation of the coating composition for an undercoat layer, calcined kaolin was used in an amount of 66 parts in place of 38 parts, 20.8 parts of latex C was used in place of 79.2 parts of latex A, 56.6 parts of hollow particles C was used in place of 100 parts of hollow particles A, and water was used in an amount of 175 parts in place of 100 parts.

Example 14

A coating composition for an undercoat layer was obtained in the same manner as in Example 1 except that in the preparation of the coating composition for an undercoat layer, hollow particles C were used in place of hollow particles A, calcined kaolin was used in an amount of 50 parts in place of 38 parts, 25 parts of latex C was used in place of 79.2 parts of latex A, the 25% solution of oxidized starch was used in an amount of 20 parts in place of 32 parts, and water was used in an amount of 130 parts in place of 100 parts.

A coating composition for a heat-sensitive recording layer was obtained in the same manner as in Example 1 except that in the preparation of the coating composition for a heat-sensitive recording layer, liquid A was used in an amount of 36.7 parts in place of 31.8 parts, liquid B was used in an amount of 73.3 parts in place of 63.6 parts, liquid C was used in an amount of 55 parts in place of 22.7 parts, the 15% aqueous solution of completely saponified polyvinyl alcohol was used in an amount of 66.7 parts in place of 46.7 parts, aluminum hydroxide was used in an amount of 27 parts in place of 32 parts, 10 parts of amorphous silica (trade name: Nipsil E-743, produced by Tosoh Silica Corporation) was further added, and water was used in an amount of 140 parts in place of 200 parts.

The heat-sensitive recording material of Example 14 was obtained in the same manner as in Example 1 except that the above coating composition for an undercoat layer and the above coating composition for a heat-sensitive recording layer were used.

Comparative Example 1

A heat-sensitive recording material was obtained in the same manner as in Example 1 except that in the preparation of the coating composition for a heat-sensitive recording layer, amorphous silica (trade name: Nipsil E743, produced by Tosoh Silica Corporation) was used in place of aluminum hydroxide.

The heat-sensitive recording materials thus obtained were evaluated for the following properties. Table 1 shows the results.

Recording Density

An image was recorded on each heat-sensitive recording material at applied energies of 0.17 mJ/dot (medium energy range) and 0.25 mJ/dot (high energy range) using a thermal recording tester (trade name: TH-PMD, produced by Ohkura Electric Co., Ltd.). The reflection density of the obtained recorded portion was measured with a spectrodensitometer (X-Rite 504, produced by X-Rite).

Plasticizer Resistance

A wrap film (trade name: Hi-S Soft, produced by Nippon Carbide Industries Co., Inc.) was wound around a polycarbonate pipe (diameter: 40 mm) three times, and a sample of each heat-sensitive recording material that had been subjected to color development using a label printer (trade name: L-2000, produced by Ishida Co., Ltd.) was placed on the film. The wrap film was further wound around the sample three times and allowed to stand at 40° C. for 24 hours for treatment. Before and after this treatment, the reflection density of the recorded portion was measured with a spectrodensitometer (X-Rite 504, produced by X-Rite). Further, the remaining percentage of the recorded portion was determined according to the following equation.

Remaining percentage (%)=(recording density after the treatment/recording density before the treatment)×100

Water Plasticizer Resistance

A wrap film (trade name: Hi-S Soft, produced by Nippon Carbide Industries Co., Inc.) was wound around a polycarbonate pipe (diameter: 40 nm) three times, and a sample obtained by immersing each heat-sensitive recording material that had been subjected to color development using a label printer (trade name: L-2000, produced by Ishida Co., Ltd.) in water for 5 seconds was placed on the film. The wrap film was further wound around the sample three times and allowed to stand at 40° C. for 24 hours for treatment. Before and after this treatment, the reflection density of the recorded portion was measured with a spectrodensitometer (X-Rite 504, produced by X-Rite). Further, the remaining percentage of the recorded portion was determined according to the following equation.

Remaining percentage (%)=(recording density after the treatment/recording density before the treatment)×100

Alcohol Resistance

Samples of each heat-sensitive recording material that had been subjected to color development using a label printer (trade name: L-2000, produced by Ishida Co., Ltd.) were immersed in 75 volume % ethanol aqueous solution for 10 minutes and for 30 minutes. Before and after this treatment, the reflection density of the recorded portion was measured with a spectrodensitometer (X-Rite 504, produced by X-Rite). Further, the remaining percentage of the recorded portion was determined according to the following equation.

Remaining percentage (%)=(recording density after the treatment/recording density before the treatment)×100

TABLE 1

| | | | | Preservation test | | | |
|---|---|---|---|---|---|---|---|
| | | | | | | Alcohol resistance | |
| | Recording density | | Recording density | Plasticizer resistance Remaining percentage | Water plasticizer resistance Remaining percentage | Immersion for 10 minutes Remaining percentage | Immersion for 30 minutes Remaining percentage |
| | 0.17 mJ/dot | 0.25 mJ/dot | before treatment | % | % | % | % |
| Example 1 | 1.01 | 1.36 | 1.37 | 99 | 79 | 95 | 79 |
| Example 2 | 1.04 | 1.40 | 1.38 | 99 | 77 | 96 | 82 |
| Example 3 | 1.09 | 1.41 | 1.46 | 99 | 71 | 92 | 84 |
| Example 4 | 0.85 | 1.28 | 1.30 | 99 | 78 | 96 | 84 |
| Example 5 | 0.98 | 1.36 | 1.35 | 99 | 78 | 96 | 81 |
| Example 6 | 0.94 | 1.35 | 1.34 | 99 | 77 | 96 | 82 |
| Example 7 | 0.87 | 1.21 | 1.20 | 98 | 77 | 96 | 83 |
| Example 8 | 1.17 | 1.40 | 1.42 | 97 | 71 | 85 | 61 |
| Example 9 | 0.92 | 1.37 | 1.45 | 99 | 90 | 89 | 75 |
| Example 10 | 0.89 | 1.38 | 1.36 | 99 | 82 | 98 | 90 |
| Example 11 | 0.94 | 1.34 | 1.41 | 99 | 93 | 88 | 78 |
| Example 12 | 0.52 | 1.14 | 1.22 | 99 | 94 | 97 | 87 |
| Example 13 | 0.73 | 1.34 | 1.36 | 72 | 20 | 79 | 40 |
| Example 14 | 0.95 | 1.27 | 1.30 | 75 | 31 | 82 | 56 |
| Comparative Example 1 | 0.92 | 1.19 | 1.22 | 23 | 11 | 49 | 17 |

INDUSTRIAL APPLICABILITY

The heat-sensitive recording material of the present invention is excellent in plasticizer resistance, water plasticizer resistance, and alcohol resistance, and sufficiently meets the requirements for improved performance of heat-sensitive recording materials, such as no color development in the blank-paper portion and no color fading in the printed portion even when it comes into contact with alcohol.

The invention claimed is:

1. A heat-sensitive recording material comprising an undercoat layer and a heat-sensitive recording layer in this order on a support,
   the undercoat layer containing hollow particles, a binder, and an inorganic pigment I,
   the heat-sensitive recording layer containing a leuco dye, a developer, and an inorganic pigment II, and
   the heat-sensitive recording layer containing an N,N'-diarylurea-based compound represented by the following formula (1):

(1)

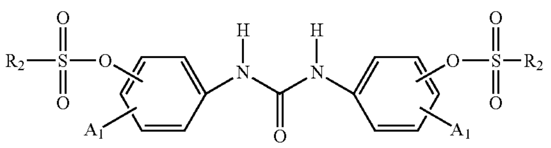

wherein $R_2$s may be the same or different, and each represents $C_{1-12}$ alkyl, $C_{7-12}$ aralkyl, or $C_{6-12}$ aryl, and the aralkyl and the aryl may be each substituted with $C_{1-12}$ alkyl, $C_{1-12}$ alkoxy, $C_{6-12}$ aryl, or halogen; Ais may be the same or different, and each represents hydrogen or $C_{1-4}$ alkyl, as the developer, and a pigment with an oil absorption of 130 ml/100 g or less as the inorganic pigment II, wherein the heat-sensitive recording layer further contains, as a second developer, 4,4'-bis(3-tosylureido)diphenylmethane.

2. The heat-sensitive recording material according to claim 1, wherein the inorganic pigment I has an oil absorption of 130 ml/100 g or less.

3. The heat-sensitive recording material according to claim 1, wherein the inorganic pigment II is at least one member selected from the group consisting of calcium carbonate, aluminum hydroxide, and clay.

4. The heat-sensitive recording material according to claim 1, wherein the hollow particles have a maximum particle diameter D100 of 10 to 40 μm and an average particle diameter D50 of 4.0 to 15 μm, the ratio of the maximum particle diameter D100 to the average particle diameter D50, i.e., D100/D50, is 1.8 to 3.0, and the volume % of particles with a particle diameter of 2.0 μm or less is 1% or less.

5. The heat-sensitive recording material according to claim 1, wherein the hollow particles have a hollow ratio of 80 to 98%.

6. The heat-sensitive recording material according to claim 1, wherein the binder of the undercoat layer has a glass transition temperature of −10° C. or less.

7. The heat-sensitive recording material according to claim 1, wherein the heat-sensitive recording layer further contains, as an additional developer, at least one member selected from the group consisting of a urea-urethane compound represented by the following formula (2);

(2)

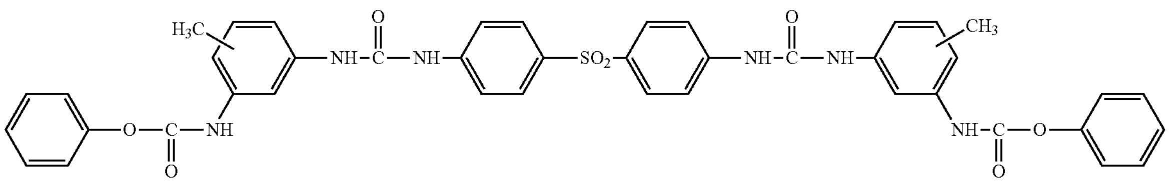

and a crosslinked diphenylsulfone compound represented by the following formula (3):

(3)

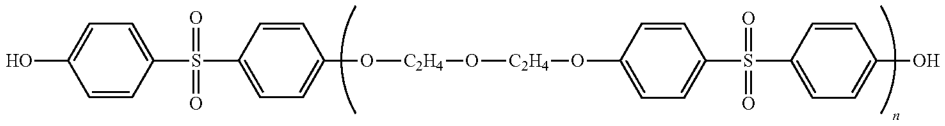

wherein n represents an integer of 1 to 6.

8. The heat-sensitive recording material according to claim 1, wherein the content of the second developer is 0.2 to 3 parts by mass, per part by mass of the leuco dye.

9. The heat-sensitive recording material according to claim 1, wherein the N,N'-diarylurea-based compound represented by formula (1) is at least one member selected from the group consisting of N,N'-di-[3-(p-toluenesulfonyloxy)phenyl]urea, N,N'-di-[3-(o-toluenesulfonyloxy)phenyl]urea, N,N'-di-[3-(benzenesulfonyloxy)phenyl]urea, N,N'-di-[3-(mesitylenesulfonyloxy)phenyl]urea, N,N'-di-[3-(4-ethylbenzenesulfonyloxy)phenyl]urea, N,N'-di-[3-(2-naphthalenesulfonyloxy)phenyl]urea, N,N'-di-[3-(p-methoxybenzenesulfonyloxy)phenyl]urea, N,N'-di-[3-(benzylsulfonyloxy)phenyl]urea, N,N'-di-[3-(ethanesulfonyloxy)phenyl]urea, N,N'-di-[3-(p-toluenesulfonyloxy)-4-methyl-phenyl]urea, N,N'-di-[4-(p-toluenesulfonyloxy)phenyl]urea, N,N'-di-[4-(benzenesulfonyloxy)phenyl]urea, N,N'-di-[4-(ethanesulfonyloxy)phenyl]urea, and N,N'-di-[2-(p-toluenesulfonyloxy)phenyl]urea.

10. The heat-sensitive recording material according to claim 1, wherein the heat-sensitive recording material further comprises an adhesive layer on at least one surface of the support.

11. The heat-sensitive recording material according to claim 1, wherein the content of the inorganic pigment I is 50 mass % or less, based on the total solids content of the undercoat layer.

* * * * *